US008595102B1

(12) United States Patent
Burdette (10) Patent No.: US 8,595,102 B1
(45) Date of Patent: Nov. 26, 2013

(54) INSURED DEPOSIT NOTE PROGRAM

(75) Inventor: William R. Burdette, Miami, FL (US)

(73) Assignee: New Affinity Concepts Corp., Miami, FL (US)

( * ) Notice: Subject to any disclaimer, the term of this patent is extended or adjusted under 35 U.S.C. 154(b) by 0 days.

(21) Appl. No.: 12/881,044

(22) Filed: Sep. 13, 2010

(51) Int. Cl.
*G06Q 40/00* (2012.01)

(52) U.S. Cl.
USPC ............... 705/35; 705/36 R; 705/37; 705/39; 705/43; 705/44; 705/4; 708/650; 380/44

(58) Field of Classification Search
USPC ............... 705/4, 35, 36 R, 37, 39, 43–44, 30; 380/44; 708/650
See application file for complete search history.

(56) References Cited

U.S. PATENT DOCUMENTS

| | | | |
|---|---|---|---|
| 4,985,833 A | | 1/1991 | Oncken |
| 5,631,828 A * | | 5/1997 | Hagan ................................ 705/4 |
| 6,611,815 B1 * | | 8/2003 | Lewis et al. ................. 705/36 R |
| 7,110,981 B1 * | | 9/2006 | Sidikman et al. ............... 705/43 |
| 7,206,761 B2 * | | 4/2007 | Colvin ............................ 705/35 |
| 7,376,606 B2 | | 5/2008 | Jacobsen |
| 7,536,350 B1 | | 5/2009 | Bent et al. |
| 7,756,767 B2 * | | 7/2010 | Cluse et al. .................. 705/36 R |
| 8,234,188 B1 * | | 7/2012 | Phillips et al. .................. 705/30 |
| 8,352,342 B1 * | | 1/2013 | Bent et al. ....................... 705/35 |
| 8,498,933 B1 * | | 7/2013 | Bent et al. ....................... 705/39 |

OTHER PUBLICATIONS

Division (Mathematics); Wikipedia; Sep. 10, 2013.*

* cited by examiner

*Primary Examiner* — Harish T Dass
(74) *Attorney, Agent, or Firm* — Mark Terry (57) ABSTRACT

A method for alternative methods of processing customer deposit offers through an automated insured deposit management system by placement of investor funds with and through one or more SPE's in deposits accounts at not less than the minimum number of funded issuers required to meet regulatory guidelines, in exchange for issuance by the SPE of an insured deposit note as evidence of the amount of funds loaned to the SPE and secured by a pledge of insured deposits, including an optional allocation of a portion of interest earned on the funds to charities, and with a record of the process and allocations being stored in connection with the SPEs and investors.

19 Claims, 8 Drawing Sheets

FIG. 1A
-- METHOD 1 --
Multi-Issuer Method for Administrator execution of
transaction for Investor sourced through Non-Issuer institution

FIG. 2

INSURED DEPOSIT NOTE PROGRAM

BACKGROUND OF THE INVENTION

1. Field of the Invention

The present invention relates to the combined fields of deposit funding to financial institutions and optional fundraising for charitable organizations. More particularly it concerns a unique and novel process of using computerized systems and processes to appropriately structure, control and manage the distribution of large deposits from investors to multiple financial institutions so that all of the investors' deposits are guaranteed by the Federal Deposit Insurance Corporation (the "FDIC") with respect to bank deposits and the National Credit Union Administration (the "NCUA") with respect to deposits in Federal Credit Unions. The result is the creation of a new and novel financial instrument issued by special purpose business entities to investors, and with the optional feature of enabling investors and financial institutions to designate a portion of interest earned on the deposits to be donated to one or more charitable organizations (the "Program").

2. Description of the Prior Art

Complex business methods have received patents for structuring expanded FDIC deposit coverage through sweep programs (Oncken U.S. Pat. No. 4,985,833), securitization of certificates of deposits (Colvin U.S. Pat. No. 7,206,761), an interbank auction method (Jacobsen U.S. Pat. No. 7,376,606) and reciprocal deposits (Bent U.S. Pat. No. 7,536,350). All of these programs are effective in achieving expanded FDIC insurance through various forms of a central transaction control process which results in a lack of flexibility, limited degree of control by banks over the size, timing and pricing of transactions and treatment of the deposits as "brokered" deposits which are not favored by the FDIC and cannot be accepted by any bank that is not "well capitalized" as defined by the FDIC.

Affinity programs are a common marketing tool used by many businesses including financial institutions like banks and credit unions so there is a value to linking a financial product with affinity groups such as charitable organizations in order to increase customerged with implementing the FDIC guarantee on deposits in all Federal and State licensed banking institutions in the United States. The NCUA is the government agency with the responsibility to charter and supervise federal credit unions and to manage that National Credit Union Share Insurance Fund (NCUSIF) which insures the accounts in all federal credit unions and the majority of state-chartered credit unions, all with the full faith and credit of the US government. All references herein to "banks", "issuers" and "financial institutions" are intended to include both banks and credit unions.

The regulations governing the insurance of deposits in financial institutions are structured to establish insurance coverage based on defined categories of ownership rights. As a result, all funds that are held in any one ownership category (even though held in different accounts), are "aggregated" (i.e., the total amount held in all of the accounts in an ownership category is subject to the insurance limit), while funds held in different ownership categories are insured separately, so the maximum amount of insurance is applied to each ownership category, not each account.

As a result of the limitations on FDIC/NUAC insurance, anyone with funds in an amount that substantially exceeds the Insured Limit Amount have generally not considered using deposits in banks or credit unions ("issuers") as an investment vehicle until methods were developed to obtain expanded coverage by distributing the funds to many financial institutions, through a "network" of financial institutions managed by an agent in a manner that allows for a "pass through" of the insurance to the investor.

Although different methods are used by different services, the "network" process of achieving expanded insurance generally involves a centralized system for controlling transactions and maintaining data on the receipt and allocation of ownership of funding from multiple investors in deposits with multiple issuers in such a manner that there is either a virtual or actual distribution of funds to deposit accounts at the multitude of issuers, with not more than the Insured Limit Amount of funds in any one financial institution being allocated to (owned by) any one depositor, so all of the depositor's funds are treated as insured. Through this "network" process, depositors are offered the convenience of placing funds in one account in the "network" with the administrator directing funds to a sufficient number of financial institutions to achieve full insurance on all of the depositor's funds, limiting the amount at any one institution to no more than the Insured Limit Amount for each depositor, while blocking placement of funds in any bank that a depositor may also have placed other deposits, thus maintaining full insurance on all of the depositor's funds in the "network." For depositors with large deposits the existing network services are very beneficial. For issuers, the network services provide a product that they could not create on their own, but they are then restricted to working within limitations that are inherent in the structure of the particular network service that they use—limits as to the size of deposits, rates offered, timing of transactions and treatment as "brokered" deposits. As an example, one of the largest network services only offers transactions once a week.

The new and novel structure of the present invention involves use of any of several corporate and unincorporated association (business trust) forms of organization, but most practically non-profit corporations and business trusts[1] as special purpose entities ("SPE's") to receive and hold funds loaned by an investor to the SPE which then places the funds in insured deposits (deposit accounts like money market, savings and NOW accounts and/or certificates of deposits ("CDs") as) directed by the investor. In exchange for the loan, the SPE issues to the investor an insured deposits note instrument as evidence of the obligation to repay the funds to the investor either on demand (for funds placed in deposit accounts like money market or savings accounts) or at maturity (for funds placed in CDs). The debtor/creditor structure of the relationship between the investor and the SPE is the meaningful factor insofar as that structure establishes that the SPE is treated as the insured entity, not the investor.

[1] These structures involve lower costs of formation and continuation of existence as well as fewer tax issues.

By using this structure, both the investors and the issuers obtain meaningful benefits. The investors' benefits are:

(a) Obtaining the same level of liquidity and security as any FDIC-insured interest bearing demand account (i.e., money market, savings, negotiable order of withdrawal (NOW) accounts, etc.) payable on demand;

(b) Receiving all of the protection associated with issuer deposit products—government regulation and audits protecting funds in the issuer; and (c) Avoiding risk of losing government insurance due to inadvertent placement of other funds of the investor in the same issuer—i.e., there is no aggregation of these deposits with other balances that the investor has at any participating issuer.

The issuers' benefits are:

(a) Obtaining far greater flexibility in executing transactions on any day, at any rate, for any term, without regard for the limiting conditions normally set by "network" services, and (b) Potentially achieving treatment of the deposits as "core" deposits rather than "brokered" deposits.

With respect to the use of a debt instrument issued to investors, prior art disclosed in the Colvin Patent[2] employs the use of a complex "securitization" process which involves issuance of debt or equity certificates by limited liability companies with many certificates being acquired in a unit investment trust or other formal securitization structure in which shares would then be offered to investors through a sophisticated SEC Rule 144 offering process that is complex, expensive and significantly limited insofar as the product is only permitted to be sold to "qualified institutional buyers."[3] This condition was set out in FDIC Advisory Opinion 04-03[4] issued to Colvin in connection with the FDIC's evaluation of that program, although no mention of this condition is included in the patent specifications or the materials disclosed in the application for the Colvin Patent relating to regulatory conditions that had to be met.[5] In addition, the structure specified in the Colvin Patent is limited by being an offering of only CDs, all of which must be issued on the same terms at the same time, in one transaction and issued simultaneously by a minimum of 100 banks—conditions that have proven to be difficult to achieve insofar as only 2 small offerings have ever been closed over the last six years.

[2] U.S. Pat. No. 7,206,761 issued to Robert Colvin Apr. 17, 2007.
[3] The term "qualified institutional buyer" or "QIB" is defined by the SEC in Rule 144A under the Securities Act of 1933, as an investing entity that owns and invests at least $100 million of securities on a discretionary basis, and has a net worth of at least $25 million. In addition to size, QIBs must be either an insurance company, investment company, employee benefit plan, trust fund, Business Development Company, 501(c)(3) not-for-profit organization, corporation, partnership, business trust or investment adviser.
[4] FDIC Advisory Opinion 04-03 dated Jul. 26, 2004.
[5] The documentation for the Colvin Patent only shows disclosure of the FDIC Advisory Opinion issued to Colvin on Dec. 19, 2002, not a later, more restrictive FDIC Advisory Opinion issued to Colvin on Jul. 26, 2004.

Unlike all of the prior art, the unique and novel method of the present invention is simple, easy to structure, costs little to implement and links easily with the inventor's existing Deposit Network® which has over 100 banks participating in the Network, so all of the necessary conditions for expanded insurance are immediately available. By using the automated method and system specified in the present invention, either the network administrator or an issuer seeking to provide expanded insurance for a customer can quickly structure and complete a transaction with expanded insurance for a single investor, at any time and on the particular terms that are agreed to with that investor.

SUMMARY OF THE INVENTION

The present invention addresses deficiencies of the prior art with respect to expanded insured deposit products and deposit fund management by providing a novel and non-obvious methods, systems and computerized processes that extend prior inventions of the inventor. It does this by using the systems and methods to create a simple, non-securitized insured deposit note instrument as a new investment product which, together with the computer implemented systems and processes described herein, enables financial institutions to initiate methods for the placement of large deposits of investors in one or more financial institutions. This is done so that all of the investors' funds are insured by the full faith and credit of the US government, while implementing an optional feature of designating a portion of the interest on deposits to be donated to one or more charitable organizations.

The method includes, first, receiving an offer of a large deposit from a customer or potential customer, and then selection of one or more of a series of SPE which meet FDIC conditions that qualify them as being engaged in an "independent activity" and which enables them to be readily employed in the process of structuring expanded insurance for the customer/investor. For this purpose, the administrator shall have formed multiple SPE that are pre-qualified to perform in this capacity.

In one embodiment of the invention, an administrator can form a master trust with an unlimited number of series or classes as sub-trusts, each of which is a separate and distinct business entity which is entitled to separate insurance on deposits held by it in any issuer. In another embodiment of the invention, an administrator can form one or more not-for-profit corporations which would also be separate business entities entitled to separate insurance on deposits held by it. In all cases, the administrator can form new SPEs and direct funding (transfer of its own funds or those of other investors in the Program) to each SPE sufficient to enable the SPEs to place deposits in multiple issuers so that each of the SPEs qualifies as being engaged in an "independent activity" as required by the FDIC, which, according to opinions rendered by the FDIC, requires distributions to at least 100 issuers.[6] Each SPE formed and funded is referred to herein as a "Pre-Funded SPE." All references to SPEs in this application shall be assumed to refer to Pre-Funded SPEs.[7]

[6] See FDIC Advisory Opinion 04-03 issued Jul. 26, 2004.
[7] The processes for SPE formation, funding and distribution are fully automated and can be completed within minutes.

The method then includes establishing for the program a maximum amount of deposits (the "System Maximum Amount") that any one SPE will place as a deposit with any one issuer, which amount is preferably (but not necessarily) less than the full amount of the Insured Limit Amount (for example, $245,000 as opposed to the maximum insured amount of $250,600) so that interest accruing on the deposit will also be insured.

The method then includes receiving in a network administrator data processing system a request from an investor to place funds in an investment that is backed by FDIC/NCUA insurance.

The method then includes a determination being made as to whether the investor is coming to the Program through an "originating issuer" (an issuer that is known to the investor and through which the investor will initiate placement of funds in the Program) and whether the originating issuer desires to have any portion of the investor's funds structured as deposits of SPEs at the originating issuer.

In one embodiment, the administrator can use the methods and systems of the present invention to organize funding to many issuers whenever no originating issuer is involved in the transaction or whenever an originating issuer is involved but does not intend to receive any portion of its customer's funds structured as deposits of SPEs at the originating issuer. In this case, the method can include administrator's selection of a series of issuers sufficient in number to hold the amount of funding by the investor by placement through one or more SPEs making deposits at the multiple issuers (e.g., the number of issuers being determined by dividing the total deposit amount by the System Maximum Amount).

In another embodiment of the invention, rather than the multi-issuer method, a different, multi-SPE method can be used for transactions involving an originating issuer that desires to receive and hold as deposits from SPEs any portion of the funds being invested by the investor/customer of the originating issuer. In this case, the method can include selecting multiple Pre-Funded SPEs, each of which will open deposit accounts at the originating issuer. To fund these accounts, each SPE receives funds from the investor as a loan in the amount of not more than the System Maximum Amount, and the SPE places the funds in a deposit account in the name of the SPE (or in the name of an agent for the benefit of the SPE) at the originating issuer, with the total amount in all accounts of all SPEs being equal to the amount of the investor's funds which the originating issuer chose to receive as deposits. Any portion of investor's funds that are not placed through an SPE at the originating issuer are placed through the administrator with other issuers, subject to any limiting instructions of the investor. As a result, all of the investor's funds placed with and through the SPEs shall be placed in separately insured deposit accounts of SPEs at the originating issuer and/or other issuers. The ability of the originating issuer to receive all of its customer's funds arises because administrator shall have already created and pre-funded SPEs so they are readily available for use by any originating issuer or the administrator. Under the circumstances, the originating issuer can choose at any time to hold an amount of deposits of SPEs equal to (or greater or less than) the amount of its investor/customer's funds in the Program. In addition, to the extent that changes occur in the level of funding by the investor/customer, the changes will be structured to directly adjust the balances of the SPEs at the originating issuer without relating to adjustment of balances or ownership interests of funds at any other issuers in the Program—i.e., there is no need for "reciprocal" funding separate and apart from the funding resulting from deposits generated as a result of changes in the level of the investor/customer's funds placed with and through the SPEs in deposit accounts at the originating issuer.

In another embodiment of the invention, whenever there are changes in the level of investment by an investor/customer of an originating issuer, there will be an option of the originating issuer to request a similar change in the amount of funds in the SPE deposits at the originating issuer. If the change is an increase in funding by the investor, the issuer can authorize the administrator to distribute the new funds to other issuers. If the change is a decrease in funding by the investor, the issuer can request that administrator maintain the level of funding to SPE accounts at the issuer by withdrawing funds from other issuers to meet the request for withdrawal of the investor. In either event, the administrator can fulfill the request of the issuer, by initiating a computer implemented algorithm which will reallocate ownership of deposits at all issuers, so that ownership allocated to the SPEs holding deposits at the originating issuer include funds of investors other than the investor/customer of the originating issuer which is requesting a withdrawal of funds from the originating issuer. In effect, the originating issuer can determine at any time and from time to time, the level of funding which it desires, regardless of whether that amount of funding to it is either equal to, greater than or less than the amount of the funds placed in the Program by the investor/customer of the originating issuer. In any event, the deposits placed with the originating issuer are funds deposited by the SPEs, not funds of any investor or customer of the originating issuer, and any changes in the level of funding into the SPE's deposits at an originating issuer will always be determined by the issuer, independent of the amount of funding provided by an investor/customer of the originating issuer (i.e., changes in the funding to the originating issuer will not be based on any changes in the level of funds of the investor/customer of the originating issuer as opposed to being based on directions from the originating issuer as to the level of funding desired by it).

The funds available from the investor for distribution to issuers can include using as few as one SPE (depending on the amount of the investment) to receive the funds and distribute the funds to 100 or more issuers with no more than the System Maximum Amount of deposits placed with any one issuer. For example, assuming that only 100 issuers are receiving deposits from one (1) SPE and selection of a System Maximum Amount of $245,000, the method can structure an investment of up to $24.5 million from any one investor; by using two (2) SPEs, the method can structure an investment of up to $49 million from any one investor; etc. Whenever the multi-issuer method is being applied, the embodiment of the invention can include a determination as to whether there are a large or small number of issuers with capacity for taking (i.e., desire to receive) deposits. If there are a large number of issuers seeking funding, only one or a few SPEs will be needed to fill the order by distributing the funds to the most number of issuers possible. If there are only a few issuers with an interest in receiving deposits, then there can be a selection of as many Pre-Funded SPEs as are needed to safely structure placement of all the deposits through those SPEs into the issuers that are seeking deposits.

With respect to the structuring of any transaction with an investor, as and when funds are invested by the investor, the method includes automatic issuance to the investor of an insured deposit note (in book entry form only—no physical document is required) from each SPE as evidence of the amount of funds placed with the SPE receiving funds from the investor, which note serves as evidence of the obligation of the SPE to repay that amount to the investor, describing the terms of the placement by the investor[8] and stating that the SPE pledges as security to investor a portion of the deposits held by it equal to the amount of funds advanced by the investor to the SPE. Perfection of the investor's security interest in the deposits is accomplished by holding of the SPE's deposits in the name of a third party institution which may be a bank, a trust company or a law firm. In each case, the third party institution holds the deposit as agent for the SPE with respect to its ownership of the deposit and as agent for the investor with respect to its security interest in the deposits.

[8] The terms would be on demand relative to money market type deposits, and at maturity relative to CDs Finally, a record of the selected portions of the funds placed with and through each SPE at each issuer is stored in connection with the investor in storage of the network administrator data processing system which integrates the deposits with other deposits held by the network administrator. In one embodiment of the invention, the method and system integrates the deposits with an "affinity" program which calculates and distributes a portion of the interest on designated accounts to be paid to charitable organizations.

In one aspect of the embodiment, the method also includes generating a report accounting, for each selected investor depositing funds through a financial institution into accounts held by or for the benefit of a series of SPE's and then distributing a portion of the funds of each SPE into deposits at other issuers participating in the network managed by the administrator with and through particular SPEs into one or more deposit accounts in a series of issuer in an amount never exceeding the System Maximum Amount for any one SPE at any one issuer. In even yet another aspect of the embodiment, the steps of selecting portions of the funds for deposit with and through one or more SPE's also includes excluding issuers specified by the investor from selection for placement of funds of the investor:

The methods of this invention are performed by systems including data processing components and facilities that are considered necessary or preferred for performing financial methods. These systems receive and post customer transactions, distribute and invest investor funds, issue directions to initiate funds transfers among issuers and track and store records for transactions, funds transfers and allocations of ownership in a database, all in a manner which is organized to be integrated with the different financial systems of all participating financial institutions, including various configurations within such institutions.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

Preferred embodiments of the present invention are disclosed herein. However, it is to be understood that the disclosed embodiments are merely illustrative of the invention that may be embodied in various forms. Each example given in connection with the various embodiments of the invention is intended to be illustrative, and not exclusive or restrictive. Specific structural and functional details disclosed herein are not intended to be interpreted as limiting, but merely as a representative basis for teaching one skilled in the art to variously employ the present invention.

Embodiments of the present invention provide a method, system and computer program for an automated deposit management process which creates the insured deposit note instrument as a new and novel deposit product with expanded FDIC/NCUA insurance and the option to link with the automatic designation of donations to any selected charitable organization. In accordance with an embodiment of the present invention, funds can be deposited by depositors with and through one or more of multiple special purpose business entities (SPEs) which will deposit up to the System Maximum Amount in each of one or more issuers as directed by a network administrator and thereby ensuring that no SPE maintains more than the Insured Limit Amount in any one issuer. Further, each investment of funds by an investor with and through the SPE's can be tracked in a database to definitively identify the amount, placement vehicle type, and particular issuer receiving funds placed by an investor through an SPE.

Figure 1:
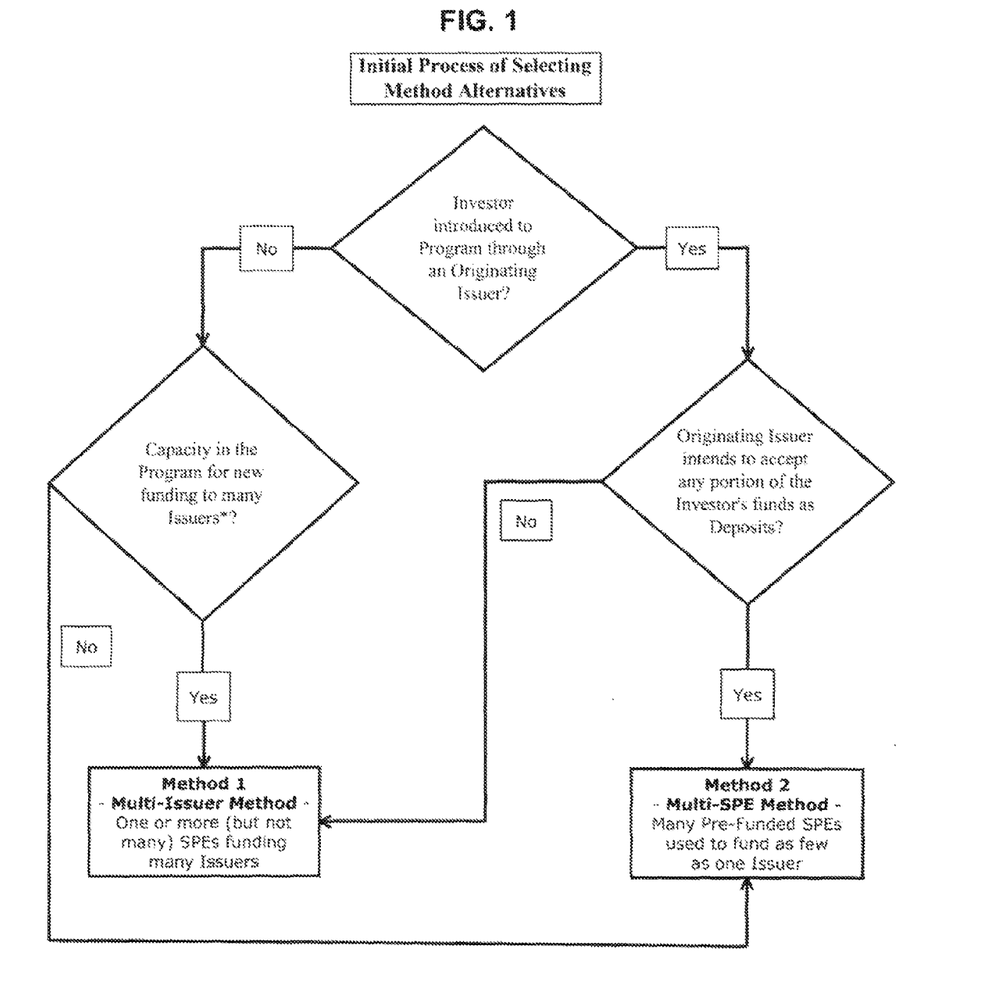
FIG. 1 illustrates the initial process of selecting method alternatives.
Figure 1A:
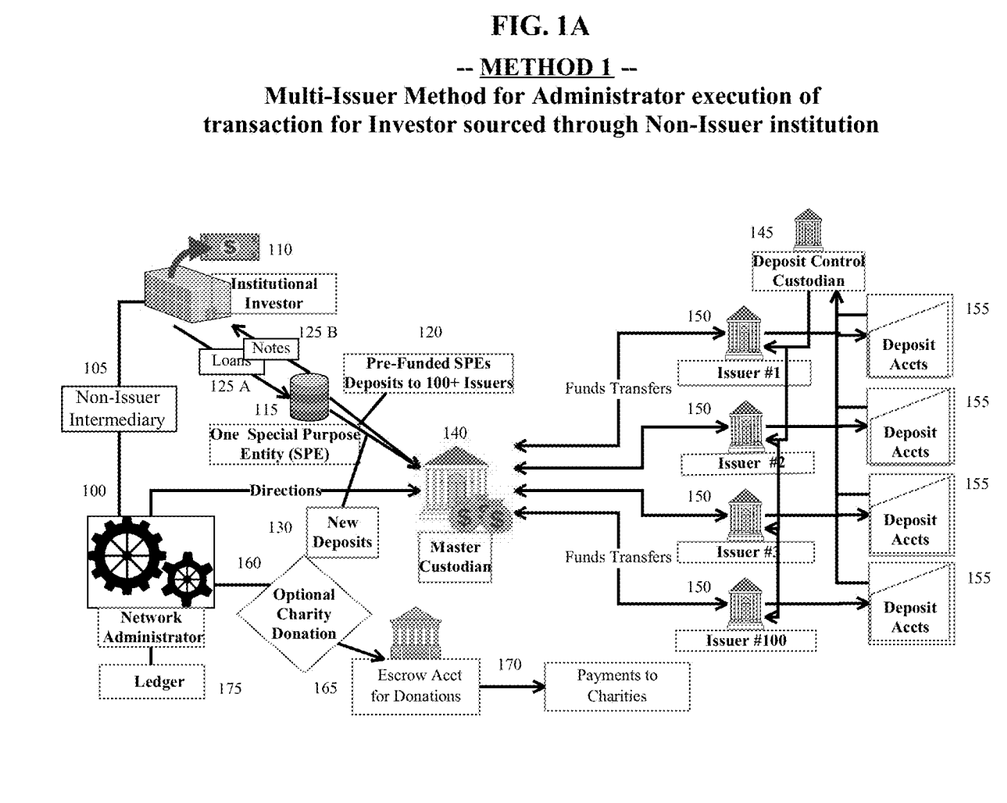
FIG. 1A is a detailed pictorial illustration of the multi-issuer method of structuring the funds distribution and management process of the invention.
Figure 1B:
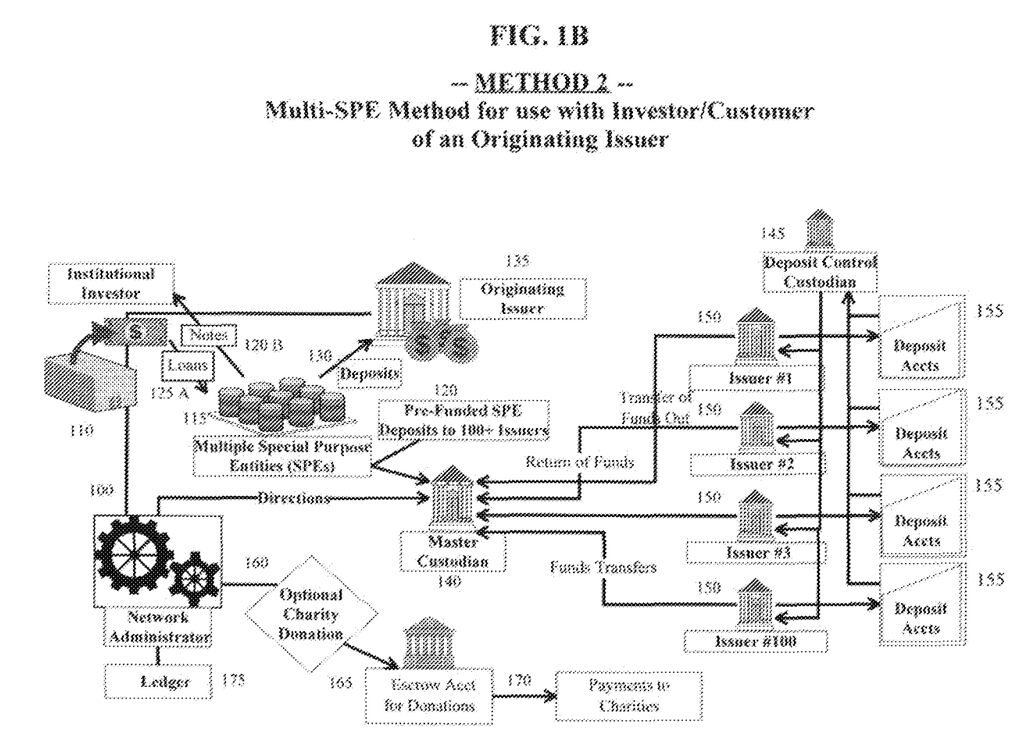
FIG. 1B is a detailed pictorial illustration of the multi-SPE method of structuring the funds distribution and management process of the invention.

FIG. 1 shows the information needed to process a determination of which of two methods of processing investor orders will be used to manage the placement of the investor's funds in the automated deposit system of the present invention. As illustrated in FIG. 1A, Method 1 is employed to direct the distribution of an investor's funds to multiple issuers using only one or a few SPEs. As illustrated in FIG. 1B, Method 2 is employed to direct the distribution of an investor's funds through multiple SPEs to only one or a few issuers.

The information required to make this determination is derived from information regarding: (1) whether an originating issuer 135 (FIG. 1B) is involved in bringing the investor 110 to the Program, and (2) whether the originating issuer 135 (FIG. 1B) intends to receive as deposits of SPEs 115 any portion of the funds being invested by the investor/customer 110 of the originating issuer 135 (FIG. 1B). If the answers to both questions are positive, then the multi-issuer method (Method 1) is used. If the answer to either of the questions is no, then the multi-SPE method (Method 2) is used.

In operation, administrator 100 receives information regarding an investor 110 which is seeking to place funds in the Program as insured deposits, together with information as to whether the investor 110 is coming through an originating issuer 135 (FIG. 1B) and, if so, whether that originating issuer 135 (FIG. 1B) intends to accept any portion of the funds to be invested by the investor 110. The following Table demonstrates the influence of the initial information on the structure to be employed by each Method:

TABLE 1

|  |  |  | Level of Investor Funding | |
|---|---|---|---|---|
|  |  |  | Low (ex: $1M) | High (ex: $10M) |
| Originating Issuer Use | High (All $) | Low ($0) | 1 SPE 4+9 Issuers 4+² SPEs 1 Issuer | 1 SPE 40+ Issuers 40+ SPEs 1 Issuer |

9 The + sign indicates a need for one extra Issuer (or SPE) to the extent that the System Maximum Amount of less than $250,000 requires use of one extra Issuer (or SPE) to hold a small portion of funds.

From Table 1 it is possible to see that achieving expanded insurance coverage can be accomplished by either the use of multiple SPEs or multiple issuers. The external conditions determine which method should be used in order to meet the interests of both the investor 110 and participating issuers, especially the originating issuer that is introducing the investor/customer 110 to the Program.

FIG. 1A illustrates the exemplary systems for practicing Method 1 (the multi-issuer method) of the present invention. When Method 1 is applied, the information obtained leads to a determination by the System Logic 280 (FIG. 2) of the number of issuers 150 required. In a simplified example of this determination, one SPE 115 can deposit the System Maximum Amount with each of a series of issuers 150 and then deposit with another SPE 115 the residual amount resulting from the deposit of less than the Insured Limit Amount. To illustrate this, if the amount to be deposited by an investor 110 is evenly divisible by $250,000, and the System Maximum Amount is $245,000, then for each issuer 150 allocated the System Maximum Amount, there will be a residual of $5,000 to be funded to some other issuer 150, which residual amount, when multiplied by the number of issuers 150 receiving funds, generates an aggregate residual amount to be deposited in one extra issuer. In operation, System Logic 280 will be applied in the determination of the number of issuers 150 to receive funding based on algorithms that will be run expressing rules relating to priority funding to preferred issuers 150, meeting requests for new funding by issuers 150 (unfunded capacity) and requests of reduction in funding by other issuers 150, and finally maximizing income by distribution of new funding to issuers 150 offering the highest rate of return on funds.

Once the number of issuers 150 is computed, the investor 110 makes a loan 125A to the SPE(s) 115 in exchange for which the investor 110 receives one or more insured deposit note instruments 125B from the SPE(s) 115 as evidence of the loan including the grant of a first security interest in the deposit(s) 130 that are transferred through the Master Custodian 140 to issuers 150. In order to perfect this security interest these deposits 130 are placed in deposit accounts 155 in the name of a deposit custodian 145 as agent for the SPE(s) 115 at the issuers 150.

FIG. 1B illustrates the exemplary systems for practicing Method 2 (the multi-SPE method) of the present invention. When Method 2 is applied, the information obtained leads to a determination by the System Logic 280 (FIG. 2) of the number of SPEs 115 required based on the information indicating that only one issuer (the originating issuer) is intending to receive any portion of the deposits being made by an investor/customer 110 of the originating issuer 135 (FIG. 1B). In a simplified example of one embodiment, each SPE 115 will be assumed to deposit the System Maximum Amount with the Originating issuer 135 (FIG. 1B) other than one final SPE 115 which will receive any residual amount resulting from the calculation. For example, if the amount to be deposited by investor 110 is evenly divisible by $250,000, and the System Maximum Amount is $245,000, then there will be a residual of $5,000, which residual amount, when multiplied by the number of SPEs 115 receiving funds, generates an aggregate residual amount to be deposited in one extra SPE 115. To the extent that these funds are being allocated to only the originating issuer 135 (FIG. 1B), this assumption will generally apply, so structuring of an investment of $1 million would require 5 SPEs 115 (4 holding $245,000 each and one holding $20,000).

Once the number of SPEs 115 required is computed, investor 110 makes a loan 125A to each of the SPEs 115 and receives in exchange an insured deposit note instrument 125B from each SPE 115 as evidence of the loan including the grant of a first security interest in the deposits 130 that are, in this case, transferred directly to the originating issuer 135 which will also be serving as the deposit custodian 145 for the SPEs 115 (for which the originating issuer 135 (FIG. 1B) is acting as agent for the SPEs 115 as owners of the deposits) and the investor 110 (for which the originating issuer 135 (FIG. 1B) is holder of the deposits as collateral for the insured deposit note instrument).

In operation of the Program for liquid funds (money market, savings accounts and the like) whenever funds are received or withdrawn, algorithms are run expressing rules in the System Logic 280 (FIG. 2) that test for any possible best allocation of deposits of the SPEs 115 to different issuers 150, based on an evaluation of the capacity for funding to and the rate of interest offered by each issuer 150, together with funding commitments made pursuant to any agreements made with issuers 150 relating to either minimum or maximum levels of deposits to be maintained with each issuer 150. These algorithms, however, will not apply to funds specifically allocated to a single issuer 150 (which could be an originating issuer 135 (FIG. 1B)) that intends or is required to maintain the funds of the investor/customer 110 at that issuer 150 or 135 (FIG. 1B). In addition, the System Logic 280 can determine whether certain of the issuers 150 must be excluded (blocked) from the selection process of the administrator 100 according to instructions given by any investor 110. Thereafter, the System Logic 280 can direct placement of the deposits of any one of the investors 110 to accounts of each SPE 115 with any of the issuers 150.

Finally, one or more computer records can be written to a ledger 175 memorializing the placement of the funds for investors 110 with and through one or more SPEs 115 in deposits at selected issuers 150, and any subsequent reallocation arising as a result of the reallocation process.

Figure 2:
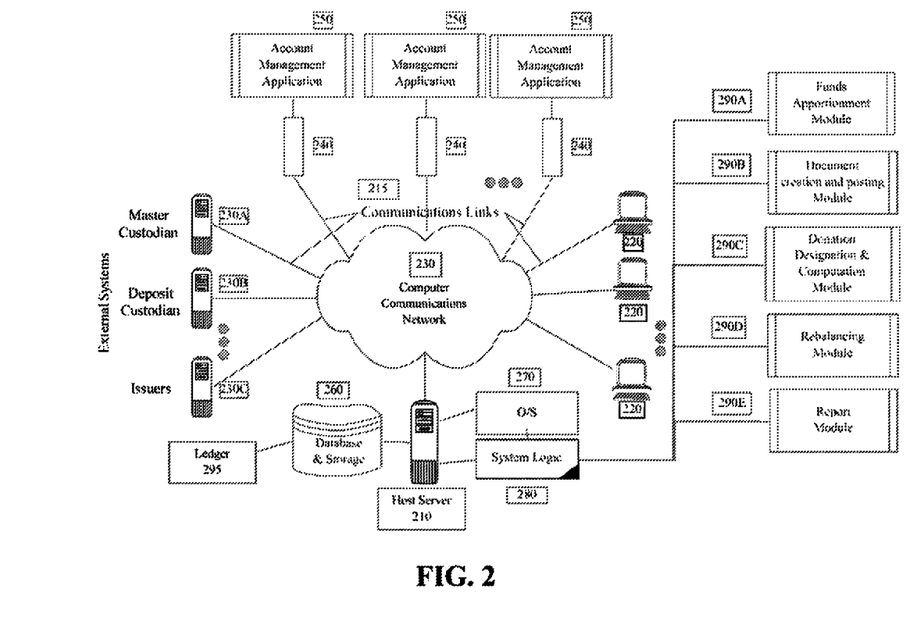
FIG. 2 is a schematic illustration of the automated placement management data processing system.

The process described in connection with FIG. 1 and the methods illustrated in FIGS. 1A and 1B can only be managed through an automated deposit management data processing system. In illustration, FIG. 2 schematically depicts an automated deposit management data processing system. The system can include a host server 210 hosting an operating system 270 supporting the execution of system logic 280 and configured for communicative coupling to different computing platforms 220 of different investors 110 or their agents, different SPE's 115 and different computing platforms 240 for different issuers 150 over inter-operative communications networks 230 which also link to network connections of the master custodian 140, deposit custodian(s) 145 and issuers 150. Each of the different computing platforms 240 can include an account management application 250 providing an interface (whether a user interface or application programming interface or messaging interface) through which system logic 280 when executed in memory by a processor of the host server 210 can direct the management of funds deposited with the issuers 150. As an optional feature, the system logic 280 can include designation of particular deposit accounts for calculation of donations to select charities through a module written for that purpose 290C. The proceeds for any charities shall be placed in escrow and paid out to the designated charities on a determined basis, probably quarterly.

The database and storage 260 can be coupled to the host server 210 and can include a ledger 295 in the form of a table, spreadsheet or database into which the system logic 280 can write and modify computer records memorializing the nature, amount and location of deposits in accounts on behalf of different SPE's 115 in different issuers 150. The computer records in the database and storage 260 further can specify information used to determine through a Donation Allocation Module 290C the amount due to a charitable organization as a portion of the interest that it has earned on deposits in an account designated for that organization. As such, the system logic 280 in accessing the computer records of the database and storage 260 can generate reports indicating for one or more investors 110 SPEs 115 and issuers 150, the nature, amount and location of deposits held by each SPE 115 for investors 110 at each issuer 150.

The system logic 280 can include program code that when executed in memory by a processor of the host server 210 can perform automated deposit management functions. The program code can include different programmatic modules, specifically a funds apportionment module 290A, a document formation module 290B, a donation allocation and calculation module 290C, a rebalancing module 290D and a reporting module 290E. The funds apportionment module 290A can include program code enabled to apportion funds according to a defined System Maximum Amount for each SPE 115 account at any issuer 150 and a System Minimum Amount for each issuer 150 requesting Stay Deposits (minimum aggregate amount of all SPE's 115 at the select issuer 150). The apportionment computed by the program code of the funds apportionment module 290A can account for application of the Insured Limit Amount for each SPE 115 to ensure that all of its deposits remain fully insured, and that the administrator 100 has applied the investors' 110 directions to exclude any specific issuers 150 from receiving any funds placed by investor 110 in the Program, even though such conflicts should no longer be of concern when one is using the present invention (there is no aggregation of deposits of SPEs 115 with those of any investor 110.

The program code of the document creation module 290B can be enabled to post as book entries all documentation required in the Program including, without limitation, declarations of trusts for SPEs 115 that are business trusts, insured deposit note instruments, and pledge and security agreements with deposit custodian 145.

The program code of the donation designation and computation module 290C can be enabled to identify SPEs 115 for which charitable organizations are designated to receive a portion of the interest earned on the deposits and to compute the amount of funds accruing for the benefit of designated charities participating in the Program.

The program code of the rebalancing module 290D can be enabled to rebalance funds on a periodic basis (such as at the end of each banking day) in order to best allocate to issuers 150: (1) funds of SPE's 115 and (2) any allocation of funds of any investor 110 in any one issuer 150 or at different issuers 150 in order to ensure that no allocation of deposits of any one SPE 115 exceeds the Insured Limit Amount, while ensuring that the funds of each SPE 115 are distributed to at least the minimum number of issuers 150 as required by the FDIC (currently 100 issuers 150) at all times and also optimizing interest earned on deposits, directing the maximum funding possible to issuers 150 offering the highest rate of interest on deposits, while also meeting any agreed upon minimum level of funding of deposits to any preferred issuers 150.

Finally, the program code of the reporting module 290E can be enabled to produce reports for administrator 100, issuers 150, and investors 110, providing an indication of the amount and location of deposits in all SPE 115 accounts at each issuer 150 which reflects distribution of the funds of the investor 110 and the interest earned on the funds.

Figure 3:
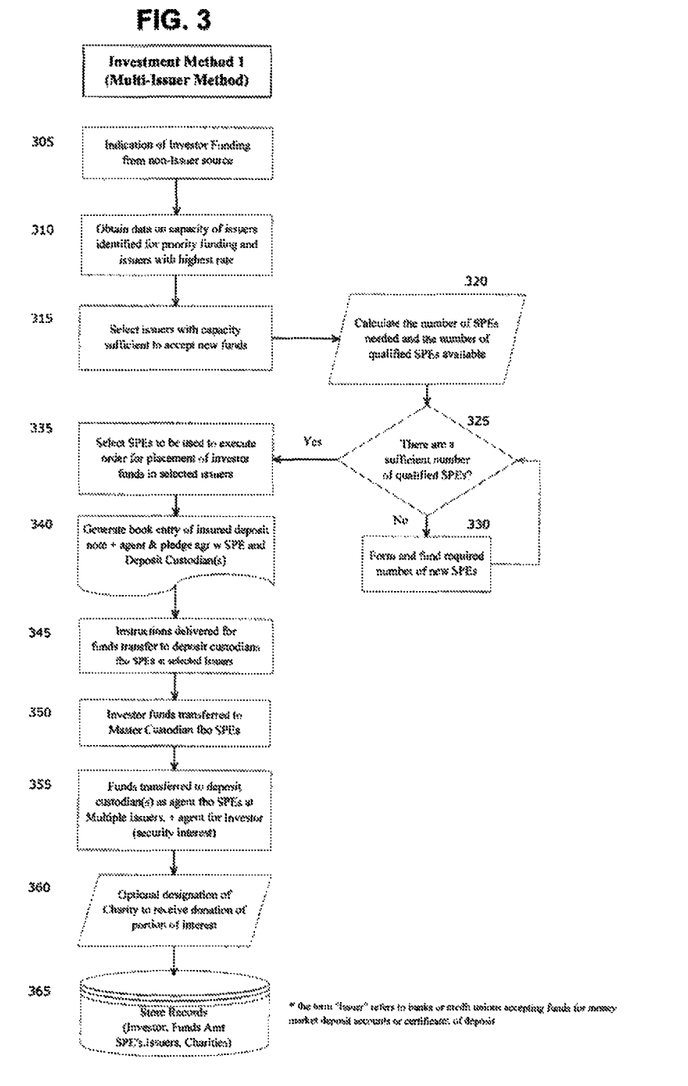
FIG. 3 illustrates the file-processing steps of the multi-issuer method of funds processing and management of this invention.
Figure 4:
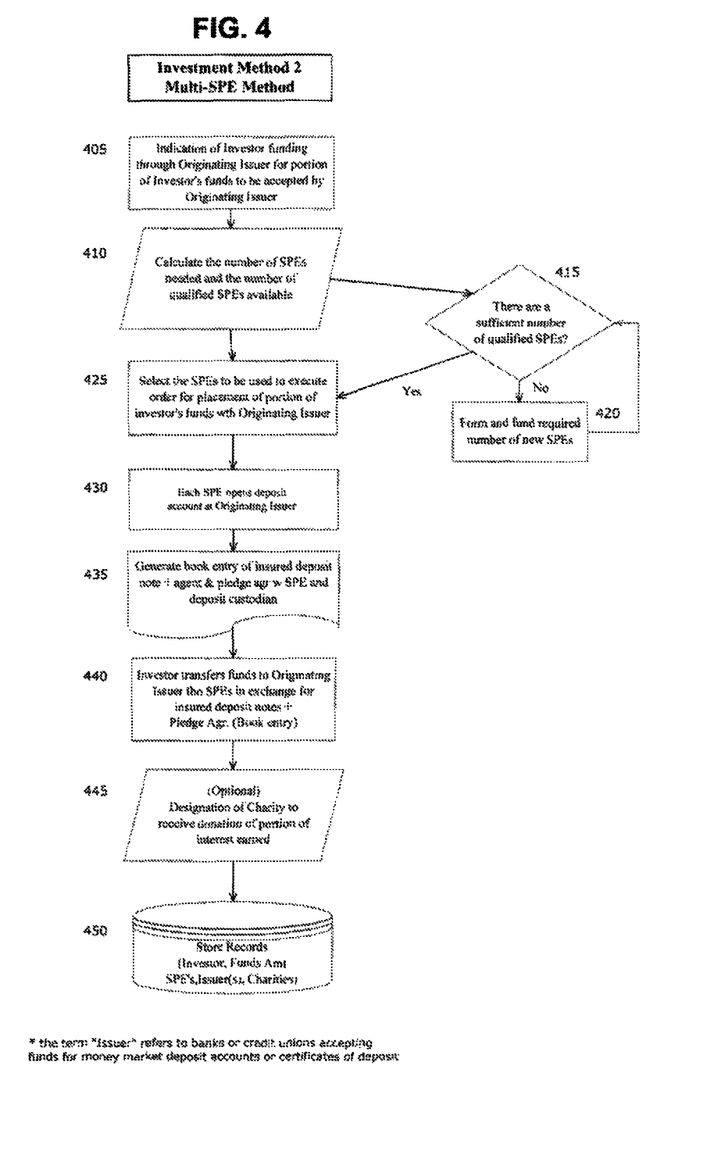
FIG. 4 illustrates the file-processing steps of the multi-SPE method of funds processing and management of this invention.

In even yet further illustration of the operation of the program code of the system logic 280, FIGS. 3 and 4, taken together, illustrate two methods employed for automated deposit allocation management.

Considering first FIG. 3, this multi-issuer method is shown for directing the depositing of funds for an investor 110 with and through accounts of one or more SPE's 115 in different accounts at different issuers 150. In block 305, a request can be received to deposit funds for an investor 110 in insured deposit accounts.

In block 310, the system obtains data on the capacity of issuers 150, with specific reference to information on the capacity of issuers 150 identified for priority funding such as new issuers 150 and issuers 150 with which the administrator 100 has entered into a STAY Deposit Agreement in which the administrator 100 assures that a certain level of deposits will be maintained at the issuer 150 (sometimes referred to as a "preferred issuer"). In addition information is obtained on issuers 150 with the highest rates of interest on the deposits placed with the issuer 150 and the capacity of these issuers 150.

With this information, a selection 315 is made of those issuers 150 with the highest priority for funding, the highest rate of interest and the capacity to receive deposits equal to the amount of the funds to be invested by the investor 110.

In block 320 a calculation is then made of (i) the number of qualified SPEs 115 needed to place the amount of funds intended to be placed in the selected issuers 150 and (ii) the number of qualified SPEs 115 then currently formed and funded and thus available to be used for the transaction. With this information it is determined 325 whether there are a sufficient number of qualified SPEs 115 or if not, that they need to be formed and funded. If additional SPEs 115 are needed, the system can act 330 to automatically form and direct administrator 100 or investor 110 funds to fund deposits in multiple issuer 150 accounts for the benefit of new SPEs 115 so that they will be qualified by FDIC standards (i.e., holding funds in the minimum number of issuers 150 as set by the FDIC—currently at 100).

Calculation of the first number involves dividing (i) the total amount of new investor 110 funds to be placed by an SPE in a particular issuer 150 by (ii) the System Maximum Amount, which we will assume to be $245,000 for the purpose of this example. If the amount of new funds is also $245,000, then one issuer 150 can receive all of the funds as a deposit made by an SPE 115 using the funds of the investor 110. If the amount of the new funds is $2 million, the number of issuers 150 required would be 9—8 issuers 150 taking $245,000 and one issuer 150 taking a residual amount of $40,000.

For the second calculation, the system determines whether an existing qualified SPE 115 already has an account at the select issuer 150, and, if so, whether the account is funded to the System Maximum Amount. If there is no account or if there is an account but it is not funded to the maximum amount, then the SPE 115 is available to be used up to the System Maximum Amount (including funds already on deposit in any other account at the selected issuer 150).

Once a determination is made as to the number of issuers 150 and SPEs 115 to be used in the process, a selection 335 is made of those SPEs 115 that are to be used to execute the order to place the investor's 110 funds in insured accounts.

In block 340, the system generates book entry of documentation required for each transaction, including, without limitation, the insured deposit note instrument, an agency agreement between the SPE 115 and any deposit custodian(s) 145 that will be holding funds on behalf of the SPE at the selected issuers 150 and a control agreement between the deposit custodians 145, each SPE 115 and the investor 110 reflecting the perfection of investor's 110 security interest in the deposits of the SPE 115 by way of the holding of the deposits in the name of the deposit custodian(s) 145.

In blocks 345 through 355 instructions are delivered for transfer of the investor's 110 funds through the Master Custodian 140 into accounts at the selected issuers 150 opened in the name of a deposit custodian 145 for the benefit of the selected SPEs 115.

In block 360, there is an optional feature of designating of a portion of interest earned on funds in particular deposit accounts to be donated to a designated charitable organization.

In block 365 the database records will store all records of the transaction including book entry of the issuance of the documentation generated, records specifying the identity of the investors 110, the selected SPE's 115 and issuers 150, portions of funds stored in the deposit accounts of the selected SPE's 115 at the selected issuers 150, and any charitable organizations designated to receive donations relative to particular deposit accounts.

Considering now FIG. 4, the multi-SPE method is shown for directing the depositing of funds for an investor 110 with and through accounts of multiple SPE's 115 to accounts that may all be at one issuer 150—usually an originating issuer 135 (FIG. 1B).

In block 405, a request can be received to accept funds from an investor 110 brought to the Program by an originating issuer 135 (FIG. 1B) that intends to receive at least a portion of the funds as deposits made on behalf of multiple SPEs 115 into the originating issuer 135 (FIG. 1B), in which event multiple pre-funded SPEs 115 would be needed to fulfill the request.

In block 410 a calculation is made as to the number of SPEs 115 that would be needed for this purpose. As an illustration of one embodiment of the present invention, if the amount of the investor's 110 funding is $2 million and that the System Maximum Amount is $245,000, then 9 SPEs 115 would be needed—8 of which would receive and then fund $245,000 to the originating issuer 135 (FIG. 1B) and one of which would receive and then fund $40,000 to the originating issuer 135 (FIG. 1B).

In block 415 a determination is made as to whether there are a sufficient number of qualified SPEs 115 available. If additional SPEs 115 are needed, the system can act 420 to automatically form and direct administrator 100 or investor 110 funds to fund deposits in multiple issuer 150 accounts for the benefit of new SPEs 115 so that they will be qualified by FDIC standards (i.e., holding funds in the minimum number of issuers 150 as set by the FDIC—currently at 100).

In block 425 the selection is made of the SPEs 115 to be used to execute the order and in block 430, the funds are placed into accounts at the originating issuer 135 (FIG. 1B) opened in the name of a deposit custodian 145 (which may be the originating issuer 135 (FIG. 1B)) for the benefit of the selected SPEs 115 as to their ownership of the deposits and as control agent for the investor 110 for the purpose of perfecting investor's 110 security interest in the deposit of each SPE 115.

In block 435, documentation is generated for the forms of agreements (preferably book entry only) used in the present invention which can include, without limitation: (i) the insured deposit note instrument from each SPE 115 to the investor 110 which serves as evidence of the loan made by the investor 110 to each SPE 115 and as the SPE's 115 pledge of a first security interest in deposits held by the SPE 115 equal to the amount of the funds advanced by the investor 110, (ii) a pledge and security agreement between each SPE 115, the investor 110 and the deposit custodian 145, pursuant to which it is agreed that the deposit custodian 145 will hold the funds of the SPE 115 deposited with issuer(s) 150 as security for the SPE's 115 obligation to repay investor 110 in accordance with the terms of the note.

In block 440, funds are received by the originating issuer 135 (FIG. 1B) into accounts reflecting that the originating issuer 135 (FIG. 1B) is receiving the funds in its capacity as a deposit custodian 145 for the benefit of the SPEs 115 as beneficial owners of the deposited funds and as agent of the investor 110 relative to the first security interest therein.

In block 445, there is an optional feature of designating of a portion of interest earned on funds in particular deposit accounts to be donated to a designated charitable organization.

In block 450 a record can be written specifying the identity of the investors 110, the selected SPE's 115 and issuers 150, portions of funds stored in the deposit accounts of the selected SPE's 115 at the originating issuer 135 (FIG. 1B), and any charitable organizations designated to receive donations relative to particular deposit accounts.

To the extent that an originating issuer 135 (FIG. 1B) only accepts a portion of funds offered by an investor/customer 110 of the originating issuer 135 (FIG. 1B), the multi-SPE Method 2 just described above would be applied to the portion that it is accepting as deposits and the multi-issuer Method 1 illustrated in FIG. 3 would be applied for the balance of funds that the investor 110 is investing but is not being accepted as deposits by the originating issuer 135 (FIG. 1B).

Figure 5:
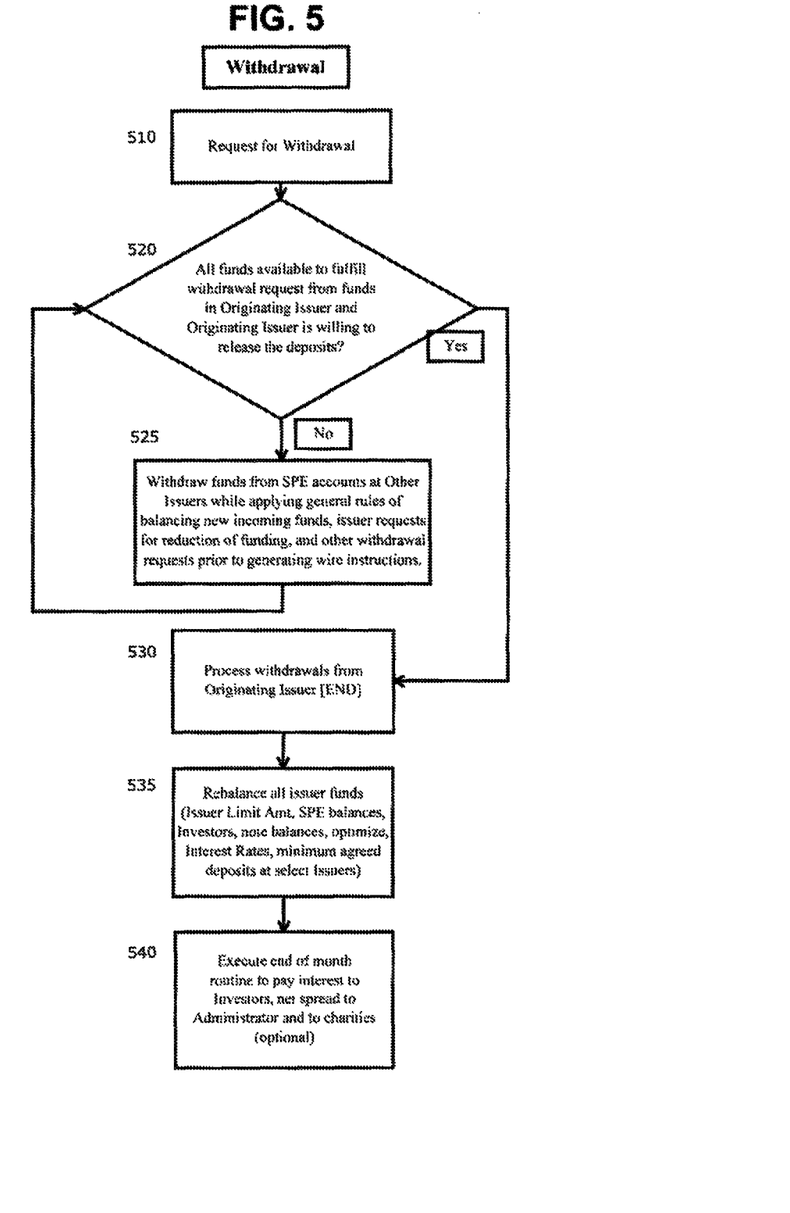
FIG. 5 illustrates the file-processing steps for withdrawal of funds.

Turning now to FIG. 5, in block 510 a request can be received from an investor 110 wishing to withdraw funds. In decision block 520 a determination can be made as to the availability funds in deposit accounts of SPE's 115 at any originating issuer 135 (FIG. 1B) to which the investor's 110 withdrawal funds would be transferred (i.e., funds in SPE 115 accounts at the originating issuer 135 (FIG. 1B) as opposed to funds generally spread to deposit accounts at multiple other issuers 150) in order to determine whether it's possible to process the full amount of the withdrawal request from accounts at the originating issuer 135 (FIG. 1B). If sufficient funds are in SPE 115 accounts at the originating issuer 135 (FIG. 1B), then the withdrawal request will be fulfilled by withdrawing funds from that originating issuer 135 (FIG. 1B).

If sufficient funds are not available from deposit assets in SPE 115 accounts at the originating issuer 135 (FIG. 1B) then instructions will be generated to withdraw the remaining portion of the withdrawal amount from deposits placed by SPEs 115 at other issuers 150.

In block 535, after the withdrawal request has been fulfilled, all funds in the Program can be rebalanced to reflect the reduction of funds in the aggregate, the reallocation of ownership of deposits and the distribution of deposits at issuers 150. That is done to ensure continuing insurance for the deposits within the limiting rules of the Program, blocked issuers 150, maximization of income from those issuers 150 with the most favorable interest rates, and the maintenance of minimum balances at preferred issuers 150.

In block 540 an end of month routine is run to calculate and pay interest to investors 110, to determine the net spread to administrator 100 and the amount to be escrowed for charities.

Figure 6:
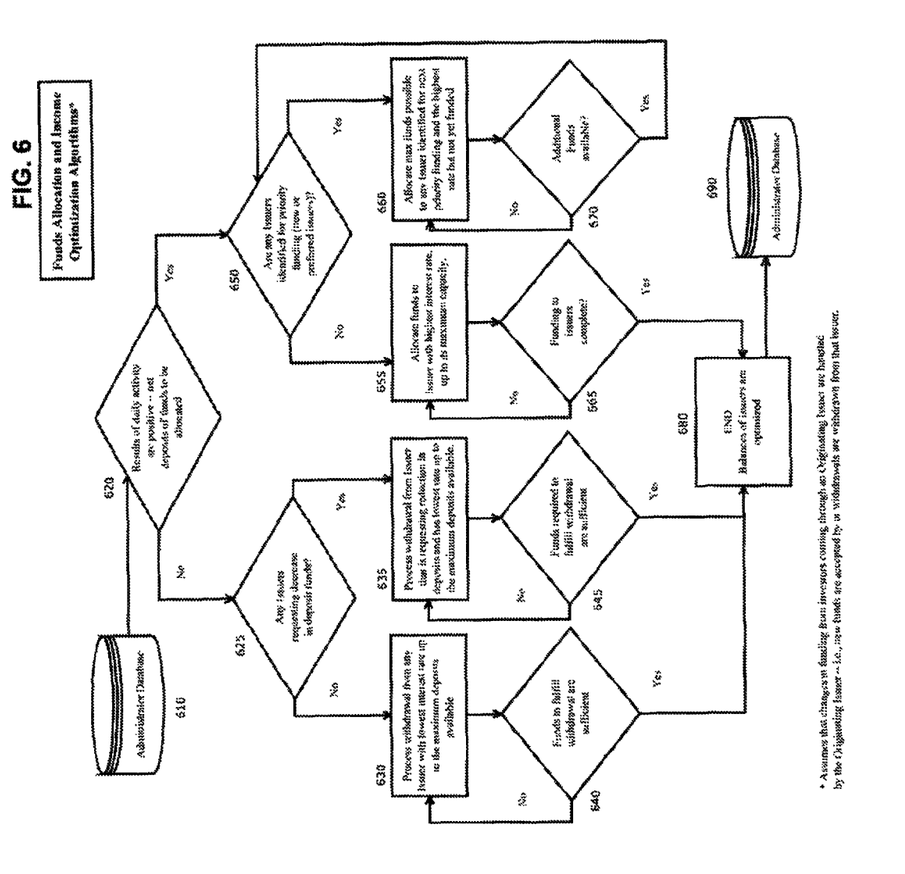
FIG. 6 illustrates the file-processing steps for processing funds allocation optimization algorithms.

For more detail on the invention's processing methods, we turn to FIG. 6 which is an illustration of the steps for funds allocation and income optimization algorithms of the Program. Step 620 retrieves data from the administrator database 610 to determine the net result of all transaction processing for the period (usually daily).

If the net transactions are negative, funds will need to be withdrawn from the Program. The first step 625 of this process determines whether any issuer 150 is requesting a decrease in its deposits. If no issuer 150 is requesting a decrease in its deposits, there can be a processing 630 of the withdrawal from an issuer 150 with the lowest interest rate on its deposits until the withdrawal amount has been obtained. The system then determines 640 if the process has created sufficient funds to fulfill the withdrawal request. If yes, then the process is complete and ends 680. If no, then the process 630 and evaluation of result 640 is repeated by processing withdrawals from other issuer(s) 150 with the next lowest rate until all the funds are obtained to fulfill the withdrawal request.

If in the alternative there is one or more issuers 150 requesting a decrease in its deposits, then there can be a processing 635 of the withdrawal from the issuer 150 with the lowest rate on its deposits. The system then determines 645 if the process has created sufficient funds to fulfill the withdrawal request. If yes, then the process is complete and ends 680. If no, then process step 635 and the evaluation of its result 645 are repeated by processing a withdrawal from an issuer 150 with the next lowest rate until all of the funds have been obtained to fulfill the withdrawal request.

Returning to step 620, if the net transactions for the period are positive, funds will need to be distributed to issuers 150 in the Program. The first step 650 of this stage of the process determines whether there are any issuers 150 that are identified for priority funding (like new issuers 150 and preferred issuers 150). If there are no issuers 150 identified for priority funding, then step 655 is processed, allocating funds to the issuer 150 with the highest interest rate, up to the maximum of its capacity for funding. The system then determines 665 if the process has allocated all of the new funds to issuers 150. If yes, then the process is complete and ends 680. If no, then process step 655 and the evaluation of its result 665 are repeated by processing allocation of funds to an issuer 150 with the next highest rate until all of the funds have been allocated to issuers 150.

If in the alternative there is are issuers 150 identified for priority funding, then step 660 is processed, allocating the maximum amount of funds possible to the issuer 150 with the next priority funding and the highest interest rate, but not yet funded. The system then determines 670 if the process has allocated all of the available new funds to issuers 150. If yes, then the process is complete and ends 680. If no, then process step 660 and the evaluation of its result 670 are repeated by processing allocation of funds to an issuer 150 with the next highest rate until all of the funds have been allocated to issuers 150.

Finally, upon ending of the funds allocation and income optimizing algorithms, step 690 is processed to update the records of the administrator's database 610.

SYSTEMS PREFERRED FOR THIS INVENTION

FIG. 2 generally illustrates the administrator systems of this invention, which together with the external systems with which the administrator systems communicate as illustrated in FIG. 2, are employed to perform the above-described methods of this invention.

The methods of this system are programmed in a suitable commercial programming language, translated into machine instructions which cause a computer 210 and its operating software 270 and database 260 to perform this invention's methods.

This invention includes a tangible product in the form of an insured deposit note instrument as well as program products comprising computer readable media containing encoded representations of the machine instructions.

The administrator systems are always in communication with the external systems of the master custodian 230A (FIG. 2) and deposit custodian(s) 230B (FIG. 2) while often also being in communication with the external systems of each participating issuer 230C (FIG. 2):

Communication links 215 between these systems can be one of many types such as private links, shared links (shared as part of private clearing house networks or networks of the Federal Reserve Board, and other similar networks).

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention described and claimed herein is not to be limited in scope by the preferred or enumerated embodiments herein disclosed, all of which have been included as illustrations of aspects of the invention. Any equivalent embodiments are intended to be within the scope of this invention. Indeed, various modifications of the invention in addition to those shown and described herein will become apparent to those skilled in the art from foregoing description. Such modifications are also intended to fall within the scope of the appended claims.

What is claimed is:

1. A method on a server for structuring a deposit amount exceeding a governmental insurance limit, such that an entirety of the deposit amount is governmentally insured, comprising:

receiving from a customer, via a financial network, a deposit amount exceeding a governmental insurance limit;

identifying a plurality of pre-existing special purpose entities (SPEs), wherein a number of the plurality of SPEs is a whole number calculated by dividing the deposit amount by an amount equal to the governmental insurance limit minus a delta;

calculating a plurality of sub-deposit amounts by dividing the deposit amount by an amount equal to the governmental insurance limit minus the delta;

defining a plurality of sub-deposits, wherein each of the plurality of sub-deposits is comprised of one of the plurality of sub-deposit amounts;

transferring, via the financial network, each of the plurality of sub-deposits to a corresponding one of the plurality of SPEs;

automatically recording, in a database, each transfer of a sub-deposit to an SPE as a loan from the customer to the SPE; and automatically generating, by a computer, an insured deposit note from each of the plurality of SPEs to the customer, wherein each insured deposit note obligates an SPE to repay to the customer an amount equal to the sub-deposit amount transferred to the SPE, and wherein each insured deposit note pledges as security to the customer an amount of funds equal to the sub-deposit amount transferred to the SPE;

wherein each sub-deposit with an SPE does not exceed the governmental insurance limit and is governmentally insured in its entirety.

2. The method of claim 1, wherein the first step of receiving from a customer further comprises receiving from the customer contact information of the customer and creating at least one user record in a database for the customer.

3. The method of claim 2, wherein the first step of calculating a plurality of sub-deposit amounts further comprises calculating the delta so as to allow a pre-defined of interest to accrue for a sub-deposit amount while maintaining the sub-deposit amount below the governmental insurance limit.

4. The method of claim 3, wherein the step of defining a plurality of sub-deposits further comprises defining a plurality of sub-deposits, wherein one or more of the sub-deposits are a money market, savings, negotiable order of withdrawal or any deposit account allowing for withdrawal of funds on demand.

5. The method of claim 3, wherein the step of defining a plurality of sub-deposits further comprises defining a plurality of sub-deposits, wherein one or more of the sub-deposits are a certificate of deposit having a length of time to maturity.

6. The method of claim 3, further comprising designating a charitable organization as a recipient of a portion of the interest accrued for one or more of the sub-deposits.

7. The method of claim 3, further comprising:

receiving a request from a first customer for withdrawal of a sub-deposit having a first amount;

identifying a sub-deposit from a second customer that allows for withdrawal on demand, wherein the sub-deposit of the second customer is for the same amount as the first amount; and exchanging ownership of the sub-deposit of the first customer for ownership of the sub-deposit of the second customer, thereby allowing the first customer to withdraw an amount of the sub-deposit on demand.

8. A computer readable storage medium storing executable instructions, which, when executed by a computing device, cause the computing device to perform a method for structuring a deposit amount exceeding a governmental insurance limit, such that an entirety of the deposit amount is governmentally insured, the method comprising:

receiving from a customer, via a financial network, a deposit amount exceeding a governmental insurance limit;

identifying a plurality of pre-existing special purpose entities (SPEs), wherein a number of the plurality of SPEs is a whole number calculated by dividing the deposit amount by an amount equal to the governmental insurance limit minus a delta;

calculating a plurality of sub-deposit amounts by dividing the deposit amount by an amount equal to the governmental insurance limit minus the delta;

defining a plurality of sub-deposits, wherein each of the plurality of sub-deposits is comprised of one of the plurality of sub-deposit amounts;

transferring, via the financial network, each of the plurality of sub-deposits to a corresponding one of the plurality of SPEs;

automatically recording, in a database, each transfer of a sub-deposit to an SPE as a loan from the customer to the SPE; and automatically generating an insured deposit note from each of the plurality of SPEs to the customer, wherein each insured deposit note obligates an SPE to repay to the customer an amount equal to the sub-deposit amount transferred to the SPE, and wherein each insured deposit note pledges as security to the customer an amount of funds equal to the sub-deposit amount transferred to the SPE;

wherein each sub-deposit with an SPE does not exceed the governmental insurance limit and is governmentally insured in its entirety.

9. The computer readable storage medium of claim 8, wherein the first step of receiving from a customer further comprises receiving from the customer contact information of the customer and creating at least one user record in a database for the customer.

10. The computer readable storage medium of claim 9, wherein the first step of calculating a plurality of sub-deposit amounts further comprises calculating the delta so as to allow a pre-defined of interest to accrue for a sub-deposit amount while maintaining the sub-deposit amount below the governmental insurance limit.

11. The computer readable storage medium of claim 10, wherein the step of defining a plurality of sub-deposits further comprises defining a plurality of sub-deposits, wherein one or more of the sub-deposits are a money market, savings, negotiable order of withdrawal or any deposit account allowing for withdrawal of funds on demand.

12. The computer readable storage medium of claim 10, wherein the step of defining a plurality of sub-deposits further comprises defining a plurality of sub-deposits, wherein one or more of the sub-deposits are a certificate of deposit having a length of time to maturity.

13. The computer readable storage medium of claim 10, further comprising designating a charitable organization as a recipient of a portion of the interest accrued for one or more of the sub-deposits.

14. The computer readable storage medium of claim 10, further comprising:

receiving a request from a first customer for withdrawal of a sub-deposit having a first amount;

identifying a sub-deposit from a second customer that allows for withdrawal on demand, wherein the sub-deposit of the second customer is for the same amount as the first amount; and exchanging ownership of the sub-deposit of the first customer for ownership of the sub-deposit of the second customer, thereby allowing the first customer to withdraw an amount of the sub-deposit on demand.

15. A computer system for structuring a deposit amount exceeding a governmental insurance limit, such that an entirety of the deposit amount is governmentally insured, the system comprising:

a memory storage;

a network connection device; and a processing unit coupled to the memory storage, wherein the processing unit is operative for:

receiving from a customer, via a financial network, a deposit amount exceeding a governmental insurance limit;

identifying a plurality of pre-existing special purpose entities (SPEs), wherein a number of the plurality of SPEs is a whole number calculated by dividing the deposit amount by an amount equal to the governmental insurance limit minus a delta;

calculating a plurality of sub-deposit amounts by dividing the deposit amount by an amount equal to the governmental insurance limit minus the delta;

defining a plurality of sub-deposits, wherein each of the plurality of sub-deposits is comprised of one of the plurality of sub-deposit amounts;

transferring, via the financial network, each of the plurality of sub-deposits to a corresponding one of the plurality of SPEs;

automatically recording, in a database, each transfer of a sub-deposit to an SPE as a loan from the customer to the SPE; and automatically generating an insured deposit note from each of the plurality of SPEs to the customer, wherein each insured deposit note obligates an SPE to repay to the customer an amount equal to the sub-deposit amount transferred to the SPE, and wherein each insured deposit note pledges as security to the customer an amount of funds equal to the sub-deposit amount transferred to the SPE;

wherein each sub-deposit with an SPE does not exceed the governmental insurance limit and is governmentally insured in its entirety.

16. The computer system of claim 15, wherein the first step of receiving from a customer further comprises receiving from the customer contact information of the customer and creating at least one user record in a database for the customer.

17. The computer system of claim 16, wherein the first step of calculating a plurality of sub-deposit amounts further comprises calculating the delta so as to allow a pre-defined of interest to accrue for a sub-deposit amount while maintaining the sub-deposit amount below the governmental insurance limit.

18. The computer system of claim 17, wherein the step of defining a plurality of sub-deposits further comprises defining a plurality of sub-deposits, wherein one or more of the sub-deposits are a money market, savings, negotiable order of withdrawal or any deposit account allowing for withdrawal of funds on demand.

19. The computer system of claim 17, wherein the step of defining a plurality of sub-deposits further comprises defining a plurality of sub-deposits, wherein one or more of the sub-deposits are a certificate of deposit having a length of time to maturity.

* * * * *